United States Patent

Frans

[15] 3,661,553

[45] May 9, 1972

[54] PROCESS FOR REDUCING OXYGEN CONTENT OF OXIDIC MINERAL ORE

[72] Inventor: Robert D. Frans, Middleburg Heights, Ohio

[73] Assignee: Allis-Chalmers Manufacturing Company, Milwaukee, Wis.

[22] Filed: Nov. 1, 1968

[21] Appl. No.: 772,753

[52] U.S. Cl. .................................... 75/3, 75/91, 266/13
[51] Int. Cl. ................... C22b 1/102, C22b 5/12, C22b 9/00
[58] Field of Search ........................... 75/35, 1-3, 91

[56] References Cited

UNITED STATES PATENTS

| | | | |
|---|---|---|---|
| 1,832,731 | 11/1931 | Pardee | 75/35 |
| 1,937,822 | 12/1933 | Jones | 75/1 |
| 1,951,342 | 3/1934 | Bradley et al. | 75/91 X |
| 2,925,336 | 2/1960 | Stowasser | 75/3 |
| 2,945,755 | 7/1960 | Schulz | 75/1 |
| 2,997,383 | 8/1961 | Whaley | 75/91 X |
| 3,005,699 | 10/1961 | Erck et al. | 75/1 |
| 3,082,078 | 3/1963 | Paull | 75/35 X |
| 3,136,625 | 6/1964 | Mader et al. | 75/35 X |
| 3,188,195 | 6/1965 | Price | 75/3 X |
| 3,421,884 | 1/1969 | Pfeiffer et al. | 75/1 |

FOREIGN PATENTS OR APPLICATIONS

| | | |
|---|---|---|
| 931,499 | 7/1963 | Great Britain ........................ 75/35 |

*Primary Examiner*—Allen B. Curtis
*Attorney*—Arthur M. Streich, Robert B. Benson and John P. Hines

[57] ABSTRACT

A process is disclosed for heat-treating mineral ore by successively drying, preheating, and reducing particles of the ores to a lower state of oxidation. The particles are gathered into a first gas permeable body with the particles at rest relative to each other within the body and dried and preheated until hardened. The body is then disrupted and a tumbling movement is imparted to the particles while further heating with heated reducing gases to initiate at least preliminary reduction. The particles are regathered into a second gas permeable body with the particles at rest relative to each other within the body and fuel that has been reformed into a stream of reducing gases rich in hydrogen and/or carbon monoxide is passed through the second body of particles to further reduce the particles. The reducing gases that have passed through the second body of particles are divided into two branch streams with a first of the branch streams being delivered to and directed through the particles being tumbled to effect a preliminary reduction, after which this gas stream is made oxidizing and passed through the first body of particles to effectuate the preheating and drying thereof. The other branch stream of gases is first mixed with a fresh supply of the hydrogen and/or carbon monoxide rich gases and thereafter recycled through the second body of particles.

9 Claims, 2 Drawing Figures

PROCESS FOR REDUCING OXYGEN CONTENT OF OXIDIC MINERAL ORE

CROSS-REFERENCE TO RELATED PATENT APPLICATION

This application discloses an annular rotary reactor assembly which is the subject of my copending United States patent application, Ser. No. 772,760 filed concurrently herewith Nov. 1, 1968 and titled "Annular Rotary Reactor," now U.S. Pat. No. 3,531,095.

BACKGROUND OF THE INVENTION

1. Field of the Invention

This invention relates to producing a strong degradation resistant particle of mineral ore of reduced oxygen and increased metal content. In particular, this invention relates to prereduction of mineral ore, which means it relates to an oxygen reducing treatment not intended to produce liquid metal but rather the intent is to reduce the oxygen content and increase the metallized content of a particle or agglomerate in the generally solid state in order to provide a pretreated charge material that will increase the capacity and fuel efficiency of a blast furnace, open hearth, electric furnace, liquid oxygen furnace or the like.

2. Description of the Prior Art

The history of the development of processes and machines for achieving prereduction of mineral ores, according to the meaning that has been attributed to the word "prereduction" in the foregoing definition of the "Field of the Invention," is related primarily to reducing the oxygen content of oxide iron ores. While some commercial production of such a prereduced iron ore product has been carried on at least since the development of the system described in U.S. Pat. No. 1,401,222, granted to F. M. Wiberg in 1919, more recent developments have occurred which are reviewed in the Journal of Metals for July, 1966, beginning at page 795 in an article titled "Prereduced Iron Ore Pellets, State of the Art" by N. B. Melcher and M. M. Fine. During the time interval since this article was written no apparatus or process has emerged as an acceptable solution for the long sought goal of lowering hot metal cost by prereduction. Indeed the long sought goal may be farther removed than it was known to be at the time that article was written, for one system has since been evaluated as not achieving hoped for operation, several plants designed according to another system have been shut down, and a plant according to still another system continues to be operated at only one location and only at that location apparently because of a government subsidy. Therefore, although many systems have demonstrated that iron pellets can be prereduced, the problem of producing such pellets in required quantities at a cost that reduces the final cost marketable metal remains unsolved. One of the systems described in the aforementioned article as having been developed by the Allis-Chalmers Manufacturing Company, is therein described as involving a traveling grate for drying and partial hardening balls of iron ore concentrate and coke, followed by a special kiln having two concentric cylinders. This system is the subject of U.S. Pat. No. 3,068,091, granted Dec. 11, 1962. Thus prior art related to prereduction has suggested utilization of a traveling grate and a double cylinder rotary kiln combination in a system which, as stated in the aforementioned article, has merit at least where small tonnages of highly reduced products are required.

Systems in which a rotary kiln is preceded by a multizone traveling grate assembly have also been successfully developed for other purposes and other industries. U.S. Pat. No. 2,466,601, of 1949 describes a rotary kiln preceded by a double chamber grate assembly that is in wide use throughout the world to produce Portland cement, and when operated according to the process of U.S. Pat. No. 2,925,336, of 1960, to produce hard pellets of oxidic iron ore. My own improvements to such systems and processes as appear in my U.S. Pat. No. 3,313,534 have also been widely used throughout the world.

A horizontal annular rotary reactor, such as will be described with regard to this invention, is further described and claimed in my patent application titled "Annular Rotary Reactor" filed concurrently herewith. Such a reactor embodies improvements to a type of annular grate shown in U.S. Pat. No. 2,256,017 of 1941. Grates, as shown in that 1941 patent, have been long used to cool material discharged from kilns in systems such as shown in the aforementioned U.S. Pat. Nos. 2,466,601, 2,925,336, and 3,313,534.

Further, reducing gas generators and reformers such as will be referred to in this description of this invention, are not per se new. Such gas producers and reformers are involved in may prior art systems, such as are shown for example in U.S. Pat. Nos. 2,547,685 of 1951 and 2,692,193 of 1954.

Thus, traveling grates, rotary kilns, gas producers and reformers, and certain types of annular grates, are machines that as system components are well known to the prior art. Likewise, many systems combining several of such components for preforming thermal treatment processes and purposes, including the production of prereduced iron ore pellets, are also known to the prior art. The apparatus features, systems and process steps that will be described with reference to the present inventions represent further improvements and advances in such technologies.

PROBLEMS IN THE FIELD AND OBJECTS OF THE INVENTION

In the description of the problems in the field and objects of the present inventions to follow, reference will be made to a percent metallization, which means the percentage of the total metal (e.g., iron) in the product that appears in its metallic (not oxide) state. That is, by referring to an iron ore pellet as having achieved 90 percent metallization, it is meant that for every 90 pounds of metallic iron in the finished product, there is also 10 pounds of iron in the finished product that is present in the form of an iron oxide.

It has been hereinbefore stated that it has long been a goal, not yet achieved in an acceptable manner, to achieve a sufficient percentage of metallization by prereduction and at a low enough cost, to lower the final total cost of hot metal, as it is delivered, primarily, from a blast furnace. The achievement of this long sought goal is the primary object of the present invention.

It has been determined by studies in the field that best improvement in blast furnace performance is achieved by charging 90 to 95 percent metallized pellets mixed with oxide ores (in the form of pellets, sinter or as lump ore) to provide in the blast furnace a charge averaging 60 to 70 percent metallization. This is so because the first stages of reducing iron ($Fe_2O_3$ or $Fe_3O_4$ to FeO) are relatively easily accomplished and the final states (FeO to Fe) are relatively difficult to achieve. So, in order to increase the capacity and efficiency of a blast furnace by prereduction of the charge, a substantial amount of the final reduction (FeO to Fe) must be achieved by prereduction otherwise such a great excess quantity of hot reducing gas is nevertheless required in the blast furnace for the difficult reducing states, that the left-over gas is still sufficiently rich in carbon monoxide to achieve the easily accomplished first stages of reduction in the blast furnace as well as the final reduction. Such gases might as well be so used for preliminary reduction or they will be wasted up a stack to the atmosphere. The average level of metallization in the blast furnace charge achieved by prereduction before the thermal energy delivered to the blast furnace can be reduced, is currently evaluated as being, as hereinbefore stated, in the range of about 60 to 70 percent. Stated in another way, this means that if the average level of metallization in the charge to a blast furnace is below the 60 to 70 percent average metallization, the blast furnace will require about as much thermal energy input as when operated with a feed that has received no prereduction treatment at all, and little or no economic benefit will have been gained from an investment in building and operating a prereduction facility. It is, therefore, a more specific object of the present invention to provide a new and improved process and apparatus for prereduction that will present the strongest reducing gas to the material at a stage of treatment when a significant amount of the final and difficult reduction (i.e., FeO to Fe) can be accomplished; and to do so with an apparatus having a capability of being built and operated to provide at that stage of treatment a sufficiently long retention time to achieve such a desired high level of prereduction metallization.

It is also an object of the present invention to provide a new and improved apparatus and process that provides for controlling the amounts and proportion of hydrogen to carbon monoxide, in the reducing gases used for final stages of reduction (FeO to Fe) in the system. The attainment of this object of the present invention is important because reduction of a metal oxide by transforming carbon monoxide to carbon dioxide is exothermic and therefore adds heat to the process while reduction of a metal oxide by transforming hydrogen to water ($H_2O$) is endothermic and therefore subtracts heat from the process. A capability of balancing these reactions is therefore an important object because too much reduction by carbon monoxide (relative to the amount of reduction by hydrogen) will cause the charge to overheat and fuse into a gas impermeable mass. On the other hand, too much reduction by hydrogen (relative to the amount of reduction by carbon monoxide) will cause the charge to cool and the process slow down to perhaps an uneconomic rate of production.

Furthermore, since strong reducing gases are expensive, it is also an object of the present invention to provide for the maximum reuse of the most expensive reducing gases, with make-up gas and heat added as needed, at the stage in the system and process where the most difficult reduction is to be achieved. Still another object of the invention is that in reusing such gas, to provide that heat may be temporarily extracted from spent reducing gases and maintained in a media, such as steel balls, while the spent gases are partly enriched by removing water and carbon dioxide therefrom, after which the heat that has been temporarily maintained in a media is returned to the expensive gas stream. Further heat may then be added to the gas stream by using the gas stream to cool the reduced mineral to at least a temperature level at which a water spray for additional cooling, or rain during outdoor storage, will not reoxidize the mineral.

A still further object of the present invention is to provide a finished product with a network of metal particles throughout to provide strength and resistance to degradation. This network of metal particles within the product is similar to the network of mineral grains in a fired pellet of finely divided oxide iron ore as shown in the aforementioned U.S. Pat. No. 2,925,336. In an oxide pellet such a network is however, of a nonmetallic mineral character whereas the object of the preferred embodiment of the invention that will be described, is to produce a prereduced pellet of finely divided particles, bound into a strong network of particles of metallic character.

SUMMARY OF THE INVENTION

In general the present invention relates to a system including a traveling grate furnace for drying and preheating a body of ore particles, a rotary kiln for further heating the particles in a reducing atmosphere and preferably at least initiating preliminary reduction of the preheated ore particles, and a reactor for collecting the particles into a second body of particles and for performing the more difficult final reduction of the ore to a metallized solid by passing strong reducing gases, rich in hydrogen or carbon monoxide, through the ore in the reactor. The reactor maintains the ore in contact with strong reducing gases long enough to achieve a high degree of metallization of the solid ore particles. The gases that have passed through and reduced the oxygen content of the ore in the reactor are to a degree spent of the strength (i.e., hydrogen or carbon monoxide content) needed to most effectively reduce the oxygen content of the ore. These gases do, however, have sufficient strength to be useful in earlier stages such as in the kiln. In the description of a preferred embodiment to follow, some of this gas will be described as being so used. With regard to the general aspects of the invention, however, it is important that these somewhat spent gases nevertheless represent a significant economic investment and therefore after admixing a make-up supply of some fresh strong reducing gases therewith, these gases are recycled through ore particles in the reactor to continue the most difficult steps of final reduction of the ore to a highly metallized solid particle.

In the preferred embodiment of the present invention, the ore will be prepared as waterbound agglomerate balls (usually called pellets) of finely divided ore. Methane or natural gas will be delivered to a gas reformer along with steam which, in the presence of the usual nickle compound catalyst used in such reformers, will reform the gas into a stream rich in both hydrogen and carbon monoxide. The reactor is annular in form and divided into two zones, one zone for reducing and another for heat recovery and cooling agglomerates. A layer of steel balls is laid on an annular rotary grate within the reactor and the agglomerates (pellets) are laid on the steel balls. The reducing gases passing downwards through the reducing zone of the reactor transfer heat contained therein to the steel balls immediately after passing through the layer of the agglomerates. The thus cooled and spent gases then pass through a condenser where further cooling removes water that has been formed by the oxygen reducing action of the hydrogen, and the gas stream is then divided into first and second branch streams. The first branch stream is delivered to the kiln and the second branch of expensive and valuable gases is passed through a carbon dioxide scrubbing system to remove carbon dioxide formed by the reducing action of carbon monoxide on the agglomerates. This second branch stream is thereby enriched in that by the removal of both water and carbon dioxide, the hydrogen and carbon monoxide each comprise greater percentages of the total gas in the second branch stream. The second branch stream is then passed upwardly through the steel balls in the second zone of the reactor, thereby recovering the heat for the process that had temporarily been stored in the balls. As the gas continues upwardly in the second zone of the reactor, and having been heated by the steel balls, this gas is still below the temperature of the upper layer of now metallized agglomerates and therefore as this gas passes through the agglomerates the gas will be further heated while the agglomerates are cooled to a temperature at which further cooling can be applied by water spray after the agglomerates are discharged from the reactor are without reoxidation of the metallized agglomerates. This heated second branch gas stream may then be still further heated by reformer flue gas and then after admixing make-up gas from the reformer to reestablish desired percentages and proportions of hydrogen and carbon monoxide, this gas stream is then returned to the reactor and again passed downwardly through the reducing zone. Meanwhile, the first branch stream of gas delivered to the kiln travels through the kiln and then passes through the body of agglomerates in preheating and drying zones of the preliminary grate assembly. Near the gas discharge end of the kiln controlled amounts of air are admixed to this gas stream to provide the stream with a highly heated oxidizing character for passage through the body of agglomerates in the preheating and drying zones of the grate assembly.

In an embodiment of the invention not utilizing a bed of heat transfer media, such as steel balls, on the annular grate, the gas flow therethrough may be either upwardly or downwardly and the agglomerates will be cooled to much lower temperatures, but of course, with less heat being recovered for reuse in the process.

A more detailed description of the preferred embodiment of the present invention, as well as more important features thereof, will follow with reference to the accompanying drawings.

DESCRIPTION OF THE PREFERRED EMBODIMENT

Figure 1:
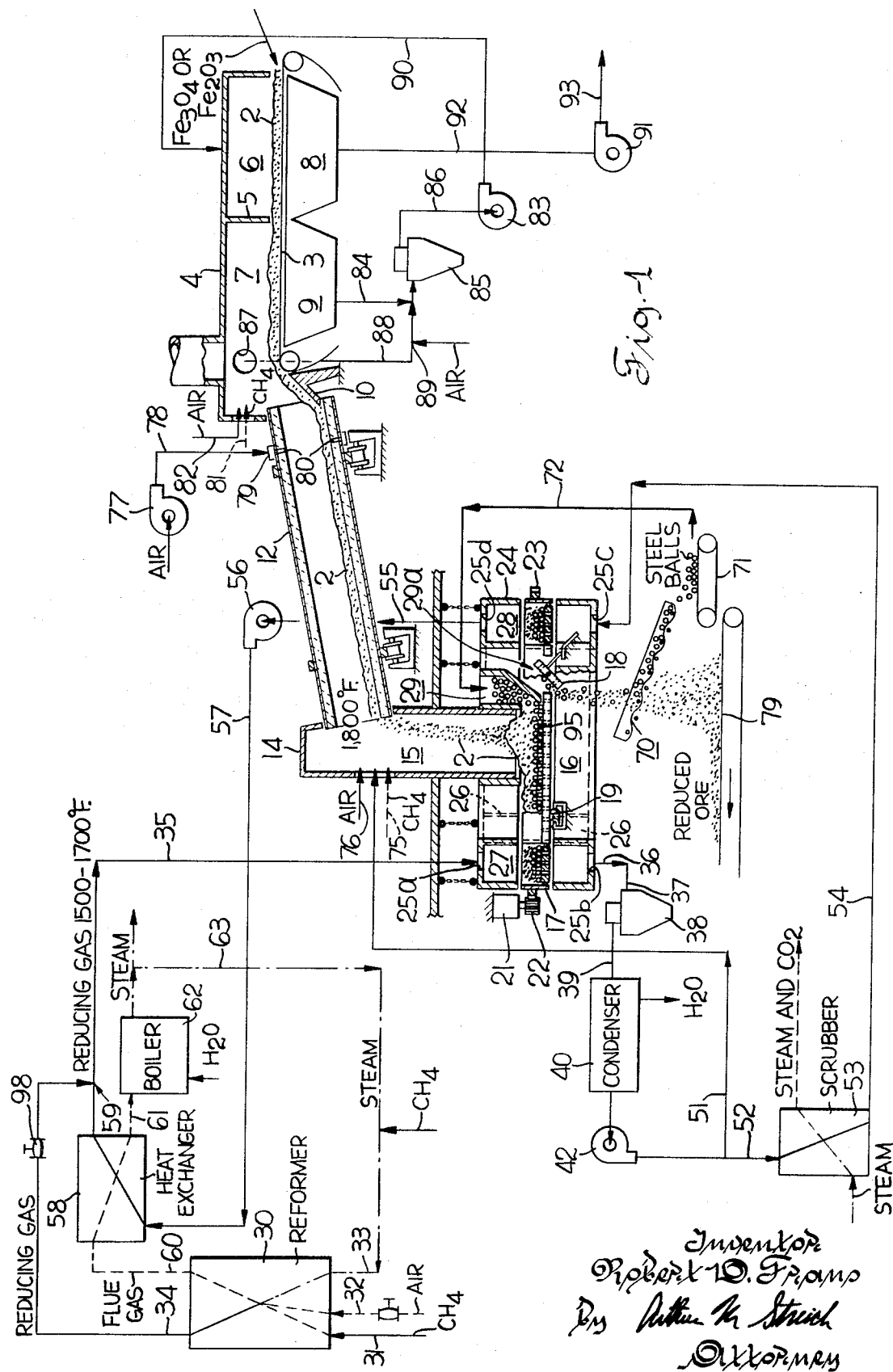
FIG. 1 of the accompanying drawings shows diagrammatically a side elevation, partly in section, an apparatus according to the present invention.

Referring to FIG. 1 of the drawings, finely divided raw material formed into suitable agglomerates 2 by such as a balling drum (not shown) which may be of the type shown in U.S. Pat. Nos. 1,994,718 and 2,411,873, is deposited on a gas pervious traveling grate 3. A housing structure 4 is provided to enclose a space over grate 3. A baffle wall 5 is provided that projects downwardly from the roof of housing 4 to a predetermined distance above the grate 3. The baffle wall 5 divides the space enclosed by housing 4 into a drying chamber 6 and a preheating chamber 7. Windboxes 8 and 9 are arranged beneath chambers 6 and 7, respectively. A chute 10 is arranged to deliver material discharged from grate 3 to the material inlet end of a rotary kiln 12.

Rotary kiln 12 slopes downwardly from chute 10 toward a hood 14 that encloses the material discharge end of kiln 12 and defines a passage 15 (which also provides a second hopper defining an ore charging zone as will appear later in this description) from kiln 12 to an annular rotary reactor assembly 16.

Figure 2:
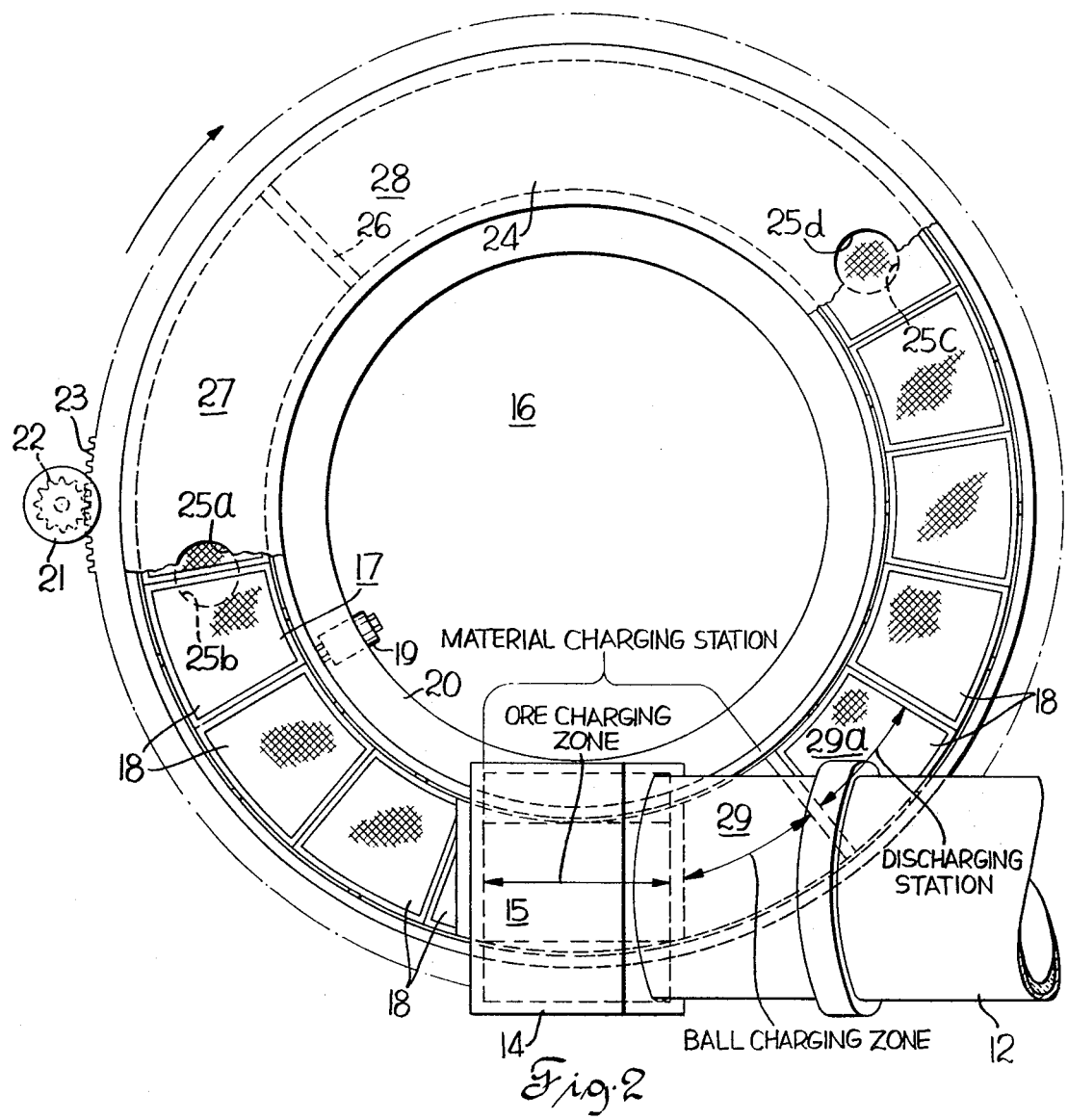
FIG. 2 is a top view of a portion of the system shown in FIG. 1 with some converging structures broken away to more clearly disclose the mechanisms.

The rotary reactor assembly 16 is arranged beneath the material discharge end of kiln 12 and oriented relative thereto as shown in FIG. 2. The reactor assembly 16 includes a gas permeable horizontal annular revolving grate assembly 17 comprising, as shown in FIG. 2, a plurality of grate segments 18 with the entire grate 17 supported for rotation about a central vertical axis by suitable means which may be for example a plurality of support rollers 19 (only one of which is shown in each figure of the drawings arranged to engage a flange portion 20 (FIG. 2) and carry the revolving annular hearth grate 17. The hearth grate 17 may be revolved by a motor 21 driving a pinion gear 22 engaging a ring gear 23 around the annular grate 17. A stationary gas confining means 24 encloses the annular revolving grate assembly 17. Within the gas confining means 24 baffles 26 divide the gas confining means 24 into a reducing zone 27 and a heat recovery and cooling zone 28. A first hopper 29 in the gas confining means 24 defines a ball charging zone for laying a layer of steel balls on grate 17 and the agglomerates from kiln 12 are charged through passage 15, which defines a second hopper, and on top of the layer of steel balls. The steel balls are of a size chosen to be larger than the size of the agglomerates 2 for a purpose that will appear as this description proceeds. The ball charging zone defined by hopper 29 and the mineral ore charging zone defined by the passage hopper 15, together define a material charging station for the rotary reactor assembly 16. The reactor assembly 16 is also provided with a material discharge station 29a which may be constructed and operated as shown in U.S. Pat. No. 2,256,017 of 1941.

A gas reformer 30 is provided with an inlet 31 for a hydrocarbon gaseous fuel such as methane ($CH_4$), an inlet 32 for air, and an inlet 33 for steam from a source that will be described later. The reformer 30 includes an outlet 34 to deliver a reformed reducing gas, rich in hydrogen and carbon monoxide, into a first conduit means 35 connected to an inlet port 25a opening into reducing zone 27 above grate assembly 17. A second conduit means 36 is connected to an outlet port 25b opening from reducing zone 27 below grate assembly 17 and establishes a gas flow path that as will be apparent as this description proceeds, eventually leads the gas back to the first conduit means 35 for recycling therethrough along with make-up gases admixed therein, according to need, through outlet 34.

The second conduit means 36 includes a pipe 37 delivering the gases from the outlet 25b, to a conical dust separator 38, a pipe 39, a condensor 40 and a fan 42. Downstream of fan 42, the second conduit means is divided into two branches 51, 52. A first branch 51 is connected to hood 14 to direct some of the reducing gas from the reducing zone 27 through the kiln 12. A second branch 52 includes a carbon dioxide scrubber 53, which may be a well known apparatus utilizing potassium carbonate ($K_2CO_3$) and steam to separate and remove carbon dioxide from a gas stream. The potassium carbonate process for removing carbon dioxide from gas, was developed by the U.S. Bureau of Mines, and the process and a sketch of the apparatus required is disclosed in a booklet titled "Hydrogen" published by the Girdler Corporation of Louisville, Kentucky, Copyright 1962. A pipe 54 delivers scrubbed reducing gas to an inlet port 25c opening into zone 28 beneath grate assembly 17. A pipe 55 is connected to an outlet port 25d opening from zone 28 over grate assembly 17 and pipe 55 thereby received gas from pipe 54 that has passed through the ball change and mineral bed on the grate assembly 17. This gas stream then passes through a fan 56, pipe 57, heat exchanger 58 and this assemblage identified by reference members 52 to 58 and described as comprising the second branch of the second conduit means 36, rejoins the first conduit means 35 at 59. The heat exchanger 58 may be of the indirect, tubular type, with heat supplied by the flue gas delivered from reformer 30 through a pipe 60. The flue gas passing through the heat exchanger 58 may be delivered by a pipe 61 to a boiler 62 to provide process steam, some of which is supplied through pipe 63, along with some methane injected at 33, to the reformer 30.

A screen 70 is arranged beneath the discharge station 29a of the hearth assembly 16 and the screen separates the relatively large steel balls from the smaller agglomerates of reduced mineral ore. A conveying means for returning the balls to the hopper 29 is indicated diagrammatically in FIG. 1 by conveyor 71 and a heavy line 72.

In addition to the first branch 51 of the second conduit means, there are other inputs to kiln 12 and the preheating furnace 2, which will now be described.

At firing hood 14 lines 75 and 76 represent inputs of fuel ($CH_4$) and air respectively, in amounts controlled to provide with the reducing gas from branch 51, a reducing atmosphere heated to temperatures that will raise the temperature of mineral in the kiln 12 to about 1,800° F near the discharge end. Near the material inlet end of kiln 12, air delivered by a fan 77 through a pipe 78 to an annular manifold 79, is injected into the kiln 12 through radial ports 80. Air is preferably injected in sufficient quantity to change the nature of the gas stream from reducing to oxidizing as it flows from the kiln into the preheat chamber 7 of housing structure 4. Lines 81 and 82 represent additional inputs of fuel ($CH_4$) and air, respectively, into chamber 7 to maintain a temperature level therein such as is needed to preheat the mineral agglomerates (after being dried in chamber 6) in an oxidizing atmosphere until the agglomerates develop sufficient internal strength to withstand the tumbling they will subsequently be subjected to in kiln 12. In processing iron ore such strength may be achieved by causing the development of mineral grain growth and bridging of adjacent grains in the manner described in the previously mentioned U.S. Pat. No. 2,925,336.

The gases in preheat chamber 7 are drawn by a fan 83 through material on grate 3 in chamber 7 and, preferably, also through a bypass around the material on grate 3 in chamber 7, in a manner according to my previously mentioned U.S. Pat. No. 3,313,534. Accordingly, a conduit 84 connects windbox 9 to a conical dust separator 85 and separator 85 is connected to a fan 83 by a conduit 86. The bypass comprises an outlet 87 in the housing 4 above the material on grate 3, and a bypass conduit 88 having a provision for admitting tempering air at 89. The bypass conduit 88 is connected to deliver gases from above the bed of material in chamber 7 to separator 85 without such gases passing through the bed of material in chamber 7.

Gases that have passed through material on grate 3 in chamber 7 and gases that have bypassed material on grate 3 in chamber 7, are discharged by fan 83 into a conduit 90 that delivers the gases to the drying chamber 6. A fan 91 draws such gases downwardly through the bed of material on grate 3 in chamber 6 and into a conduit 92. These gases are blown by fan 91 through a conduit 93 to a stack (not shown) for discharge to the atmosphere.

A method will now be described for operating the described apparatus to perform the process of the present invention. By way of example, the operation and process will be described as applied to processing about 1,000 tons per day of hematite iron ore ($Fe_2O_3$) into pellets of approximately 90 percent metallization.

Hematite ore may be prepared for the process by agglomerating finely divided particles into balls (pellets), which may be desired to be about + ⅜-¾ inch, in a drum (not shown) as described in the previously referred to U.S. Pat. Nos. 1,994,718 and 2,411,873. The pellets of iron ore are gathered into a first gas permeable body of pellets on grate 3 in chamber 6. Individual pellets are at rest relative to each other within this moving body on grate 3. The pellets in chamber 6 are dried by gases at 500° to 900° F passing from conduit 90 downwardly through the bed of pellets on grate 3 in chamber 6 and into windbox 8. Grate 3 carries the bed of pellets into and through chamber 7 where the pellets are preheated by gases from kiln 12 and by gases introduced to chamber 7 where indicated by lines 81, 82. The temperature of the pellets in chamber 7 is raised to between 1,600° to 1,800° F. (If the ore was initially a magnatite ore, or any such ore is present in a mix or blend, it will thermally convert to hematite at these temperatures.) At these temperatures, bridges between adjacent grains of hematite begin to form, as shown in FIGS. 4 and 5 of the previously referred to U.S. Pat. No. 2,925,336, and such bridges provide the individual agglomerates sufficient strength and degradation resistance to withstand tumbling in a kiln.

Having reached the level of strength and degradation resistance required to withstand tumbling in a kiln, the body of pellets on grate 3 is disrupted by discharging the pellets down chute 10 and into kiln 12. As the pellets tumble down the incline of kiln 12, they become exposed to reducing gases hot enough to ensure the balls being heated in kiln 12 to about 1,800° F and preferably the gases are of sufficient strength (i.e., sufficiently rich in $H_2$ and CO) to at least begin some of the reduction of the $Fe_2O_3$ to FeO.

At hood 14 the pellets from grate 3 at about 1,800° F are discharged from kiln 12 and fall through passage 15, defining a second hopper, adjacent the first hopper 29. The first hopper 29 deposits a layer of relatively cool steel balls 95 on hearth grate 17 and the pellets of FeO falling through the second hopper passage 15 are gathered once again into a (second) gas permeable body, on top of the layer of steel balls 95, and moved around the annular path within the reactor assembly 16. As the pellets are carried around the annular path on the segments 18 that make up reactor grate assembly 17, they are carried through the reducing zone 27.

In order to reduce the oxygen content of the pellets to the desired degree of metallization, while passing through zone 27, the reactor assembly 16 must be of a diameter and turn at a speed chosen to provide the relatively long retention time of the pellets in zone 27 to achieve such desired reduction and a strongly reducing gas stream for passing through the bed of pellets on the grate assembly 17 will be needed. Preferably, this gas stream is provided by the reformer 30. The reformer 30 (which as previously stated may be of a well known type) may operate with methane, steam, air, and a nickle compound catalyst to reform methane or natural gas to provide a reducing gas rich in hydrogen and carbon monoxide. This gas stream will pass from reformer 30 through outlet 34 to the first conduit means 35 at 59 where it is admixed in controlled amounts (by such as a valve 98) with recirculating gas from pipe 57 that has passed through heat exchanger 58, to provide in the first conduit 35 to zone 27 of hearth assembly 16, a gas stream at approximately 1,500° to 1,700° F and comprising, for the example being described approximately 135.67 Lb-Mol/minute of gas containing approximately 56.8 percent hydrogen, 37.8 percent carbon monoxide, 4.7 percent carbon dioxide, and 0.7 percent residual methane.

The gases from the first conduit means 35 pass through the pellets on the hearth grate 17 within zone 27 to reduce the oxygen content of the pellets to provide the desired degree of metallization, strength and degradation resistance, and then this gas stream passes downwardly through the layer of steel balls which may optionally be provided. If a layer of steel balls is not utilized, then an upflow of reducing gases through pellets in zone 27 will also be suitable.

With the arrangement shown in the drawing and including a layer of steel balls, the temperature of the downward flowing reducing gases in zone 27 will change very little while passing through the pellets because the pellets discharged from kiln 12 are at very nearly the same temperature as the reducing gases passing into zone 27. As the reducing gases pass downwardly through the layer of steel balls, however, the reducing gases will transfer much of their heat to the balls and heat the balls, gradually to perhaps about 1,500° F before the balls are carried from zone 27 and into zone 28. As the steel balls forming the bottom layer are thusly being heated, the temperature of the gas stream will drop and the temperature of the gases in pipe 37 of the second conduit means will average about 700° to 800° F. The gases in pipe 37 are delivered to the dust separator collector 38 and at this stage in the process, for the example being described, will comprise approximately 136.47 Lb-Mol/minute of gas containing 48.10 percent hydrogen, 35.24 percent carbon monoxide, 7.04 percent carbon dioxide, and 9.62 percent water (as vapor or steam). These gases pass through pipe 39 to condenser 40 where the water is removed. The fan 42 discharges the gases to the branches 51, 52. Branch 51 delivers a first of the gas streams to hood 14 at the discharge end of kiln 12 and branch 52 delivers a second of the gas streams to the carbon dioxide scrubber 53. Removal of water by condenser 40 and carbon dioxide by scrubber 53 results in the gas stream, in pipe 54, being substantially all hydrogen and carbon monoxide. The total amount of gas is of course reduced by removing the water (vapor) and carbon dioxide but by so doing the remaining gas is richer in carbon monoxide and hydrogen than the spent gases coming from the reducing zone 27. The enriched stream of expensive gases represents a substantial economic investment and it is therefore desirable to reuse these gases to the greatest extent possible. As shown in FIG. 1 these gases are directed from pipe 54 upwardly through zone 28. As these gases pass upwardly through the layer of steel balls, heat is recovered that has been stored in the balls and then the gases pass upwardly through the now metallized pellets containing Fe, that have passed from zone 27 to zone 28, to cool these pellets in a monoxidizing atmosphere and further heat the gases. Because this gas stream is reheated by the layer of steel balls in zone 28 before cooling the pellets in this zone 28, the pellets containing Fe will be cooled from the range of approximately 1,700° to 1,800° F to only the range of approximately 400° to 500° F. This lowering in temperature of the metallized mineral pellets is sufficient, however, to allow for further cooling by means of outdoor storage or water spray without reoxidizing the iron. If the process is used without the layer of steel balls, the metallized pellets will be cooled to much lower temperatures with much cooler gases. However, eliminating the layer of steel balls will result in less heat being recovered for the process because the gases from zone 27 to condenser 40 will be much hotter and more heat will be lost in removing water from the gas stream. Whether it is decided to operate with maximum heat recovery for the process (i.e., with a layer of steel balls) or maximum cooling of the reduced pellets with reducing gases (i.e., without a layer of steel balls) it is a matter of comparative economics. Both approaches are within the spirit of the present invention. In the present example, with grate assembly 17 discharging approximately 1,800 lbs. steel balls per minute at approximately 100° F and approximately 1,100 lbs. per minute of pellets at approximately 400° to 500° F, the gas stream passing out of zone 28 in pipe 55 will be preheated to approximately 800° F. In order to bring this gas stream up in temperature, composition and quantity to the levels previously referred to as desirable in the first conduit means 35 in this example, the gas stream from pipe 57 is passed through heat exchanger 58 where it is heated by flue gas delivered thereto by pipe 60 from reformer 30, and then at 59 receives gas from outlet 34 of the reformer 30 which is admixed with the gases from pipe 57. The heat transferred by exchanger 30 and the hot make-up gas admixed at 59, continually provide a gas stream of the quantity, mixture and temperature required to be delivered to zone 27 by the first conduit means 35, in order to reduce the oxygen content of the pellets and achieve the desired degree of metallization.

The gas stream from reactor assembly 16 has make-up gas admixed therewith at 59, rather than recirculating the gas from the reactor through reformer 30, because if this gas were recirculated through reformer 30, much more steam would be required by the reformer in order to prevent carbon precipating and poisoning the catalyst.

The cooled pellets containing metallized Fe iron are carried by grate assembly 17 to the discharging station 29a where each grate segment 18 tilts as shown in FIG. 1, to discharge both the metallized pellets and the layer steel balls to a screen 70. The steel balls which are preferably provided that are substantially larger than the pellets and openings in screen 70, will therefore pass over (not through screen 70 as shown in FIG. 1, to a conveyor 71 to be carried along the ball flow path indicated by the heavy line 72, back to the first hopper 29 for recharging on grate assembly 17. The metallized pellets, with their oxygen content having been reduced by the flow of gases, that have been described, and because these pellets are smaller than openings in screen 70, these metalized pellets will pass through screen 70 to a conveyor 79 for transport as desired.

From the foregoing detailed description of preferred and typical embodiments of apparatus and process steps according to the present invention, it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A process of heat-treating mineral ore comprising successively drying, preheating, and reducing the state of oxidation of particles of the ores, and then developing a network of metal bridges through the ore particles, characterized by the steps of:
   a. gathering the ore particles into a first gas permeable body with the particles at rest relative to each other within the body;
   b. drying and preheating the body of particles until the particles harden sufficiently to withstand tumbling;
   c. disrupting the body of particles and imparting tumbling movement to the particles while further heating the particles with heated reducing gases to initiate at least preliminary reduction of the particles to a lower state of oxidation;
   d. regathering the particles into a second gas permeable body with the particles at rest relative to each other within the body;
   e. providing fuel that has been reformed into a stream of reducing gases rich in gases from a group comprising hydrogen and carbon monoxide;
   f. passing the rich gases through the second body of particles to further reduce the particles;
   g. dividing the gases that have passed through the second body of particles to reduce the oxygen content thereof into two branch streams with a first of the branch streams being delivered directly to and directed through the particles being tumbled to effect a preliminary reduction thereof prior to regathering the particles into said second body for a final reduction thereof; and
   h. recycling the other branch stream of gases that have passed through the second body of particles by first mixing therewith a fresh supply of the said stream of gases rich in hydrogen and/or carbon monoxide by reforming a fuel to form a combined gas stream and thereafter passing the combined gas stream through the second body of particles to reduce the state of oxidation of the particles.

2. A process according to claim 1 in which the particles regathered into a second body are transported along a predetermined path through at least two zones while the rich gases are passed through the body of particles in the first zone to reduce the oxygen content thereof, and such gases after having passed through the body of particles in the first zone are then passed through the body of oxygen reduced particles in the second zone to raise the temperature of such gases by recovering heat from the reduced particles, and thereafter such heated gases from the second zone are utilized to form the combined gas stream of such gases recycled with the fresh supply of the rich gases.

3. A process according to claim 2 in which the second body of particles is disposed on top of a horizontal gas pervious bed of heat transfer media and transported along a horizontal path, the gases are passed downwardly through the body of particles and bed of media in the first zone, and such gases after having passed through the body of particles and bed of media in the first zone and such gases after having passed through the body of particles and bed of media in the first zone are then passed upwardly through the media and the body of oxygen reduced particles in the second zone to raise the temperature of such gases by recovering heat that had been temporarily stored in the media and from the reduced particles, and thereafter such heated gases from the second zone are utilized to form the combined gas stream of such gases recycled with the fresh supply of the rich gases.

4. A process according to claim 3 in which the heat transfer media in the bed is of a predetermined size larger than the particles in the body of particles disposed thereon, the particles and media are screened after passing through the second zone to separate the relatively larger media from the relatively smaller reduced particles, and the media is thereafter recirculated to again provide a gas pervious bed for particles gathered thereon into a second body for transport through the reducing and heat recover zones.

5. A process according to claim 4 in which the particles are prepared from fines which are agglomerated into particles of substantially uniform size.

6. A process according to claim 4 in which the particles are prepared from fines which are rolled in balls of substantially uniform diameter.

7. A process according to claim 1 in which the mineral ore is particles of oxidic iron ore, the particles in the first body are dried and preheated in an oxidizing atmosphere until any magnetite present is oxidized to hematite and adjacent grains of hematite begin to form mineral bridges therebetween, the thereafter tumbling particles are so treated until the reduction of iron ore to wüstite (FeO) is at least initiated by the first branch of the gas streams which is changed to oxidizing and utilized to preheat and dry the particles in the first body.

8. A process of heat-treating mineral ore comprising successively drying, preheating, and reducing the state of oxidation of particles of the ores, and then developing a network of metal bridges through the ore particles, characterized by the steps of:
   a. gathering the ore particles into a first gas permeable body with the particles at rest relative to each other within the body;
   b. drying and preheating the body of particles until the particles harden sufficiently to withstand tumbling;

c. disrupting the body of particles and imparting tumbling movement to the particles while further heating the particles with heated reducing gases to initiate at least preliminary reduction of the particles to a lower state of oxidation;

d. regathering the particles into a second gas permeable body with the particles at rest relative to each other within the body;

e. reforming a fuel containing components from a group containing hydrogen and carbonacious components into a stream of reducing gases rich in gases from a group comprising hydrogen and carbon monoxide;

f. passing the rich gases through the second body of particles to further reduce the particles;

g. dividing the gases that have passed through the second body of particles to reduce the oxygen content thereof into two branch streams with a first of the branch streams being delivered directly to and directed through the particles being tumbled to effect a preliminary reduction thereof prior to regathering the particles into said second body for a final reduction thereof; and h. recyling the other branch stream of gases that have passed through the second body of particles by first mixing therewith a fresh supply of the said stream of gases rich in hydrogen and/or carbon monoxide by reforming a fuel to form a combined gas stream and thereafter passing the combined gas stream through the second body of particles to reduce the state of oxidation of the particles.

9. A process according to claim 8 in which the gases that have passed through the second body of particles to reduce the oxygen content thereof are thereafter reheated by heat from the fuel reforming step before rich gases of reformed fuel from the reforming step are admixed therewith for forming the combined gas stream for subsequent passing through the second body of particles.

* * * * *